US009922784B2

(12) United States Patent
Levay et al.

(10) Patent No.: US 9,922,784 B2
(45) Date of Patent: Mar. 20, 2018

(54) CONTROL DIAL HAVING MULTIPLE TORQUE AND DETENT PROFILES

(71) Applicants: DENSO International America, Inc., Southfield, MI (US); DENSO CORPORATION, Kariya-shi, Aichi-ken (JP)

(72) Inventors: Christopher Levay, Grand Rapids, MI (US); Christopher Guzman, Saint Clair Shores, MI (US); Gareth Webb, Farmington, MI (US); Cary Horvath, Dearborn, MI (US); Marc Arceo, Livonia, MI (US); Michael Lozano, Detroit, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/200,903

(22) Filed: Jul. 1, 2016

(65) Prior Publication Data
US 2018/0005780 A1 Jan. 4, 2018

(51) Int. Cl.
| | |
|---|---|
| *H01H 67/06* | (2006.01) |
| *H01H 19/08* | (2006.01) |
| *B60H 1/00* | (2006.01) |
| *B60N 99/00* | (2006.01) |
| *H01H 19/54* | (2006.01) |

(52) U.S. Cl.
CPC ........... *H01H 19/08* (2013.01); *B60H 1/0065* (2013.01); *B60N 99/00* (2013.01); *H01H 19/54* (2013.01)

(58) Field of Classification Search
CPC .... H01H 19/11; H01H 3/00; H01H 2003/008; H01H 3/503; G05G 1/10
See application file for complete search history.

(56) References Cited

U.S. PATENT DOCUMENTS

| | | | | |
|---|---|---|---|---|
| 7,732,724 | B2 * | 6/2010 | Otani | B60K 37/06 200/565 |
| 7,741,938 | B2 * | 6/2010 | Kramlich | B60K 37/06 200/43.11 |
| 7,804,036 | B2 * | 9/2010 | Ishigaki | B60K 37/06 200/336 |
| 7,902,468 | B2 * | 3/2011 | Miyata | H01H 3/50 200/50.01 |
| 2009/0272207 | A1 * | 11/2009 | Buckingham | B60K 37/06 74/10.41 |
| 2012/0055763 | A1 * | 3/2012 | Chou | H01H 25/065 200/4 |
| 2016/0209863 | A1 * | 7/2016 | Stringos | G05G 1/10 |

\* cited by examiner

*Primary Examiner* — Bernard Rojas
(74) *Attorney, Agent, or Firm* — Harness, Dickey & Pierce, P.L.C.

(57) ABSTRACT

A rotary dial assembly including a dial portion and a base portion. The dial portion has a knob extending from a first side of the dial portion. An outer detent profile and an inner detent profile are on a second side of the dial portion that is opposite to the first side. The inner detent profile is closer to a center of the dial portion than the outer detent profile. The outer detent profile includes a plurality of outer detents, and the inner detent profile includes a plurality of inner detents. The base portion includes an outer detent engaging member movable to selectively engage the outer detent profile, and an inner detent engaging member movable to selectively engage the inner detent profile.

16 Claims, 3 Drawing Sheets

CONTROL DIAL HAVING MULTIPLE TORQUE AND DETENT PROFILES

FIELD

The present disclosure relates to a control dial having multiple torque and detent profiles.

BACKGROUND

This section provides background information related to the present disclosure, which is not necessarily prior art.

Rotary dials are often used in vehicles to provide control over various vehicle functions, such as heating, ventilation, and air cooling functions (HVAC), and entertainment system functions, such as volume control. While current rotary dials are suitable for their intended use, they are subject to improvement. The present teachings provide for an improved rotary dial that has numerous advantages over current rotary dials, as explained herein and as one skilled in the art will recognize.

SUMMARY

This section provides a general summary of the disclosure, and is not a comprehensive disclosure of its full scope or all of its features.

The present teachings provide for a rotary dial assembly including a dial portion and a base portion. The dial portion has a knob extending from a first side of the dial portion. An outer detent profile and an inner detent profile are on a second side of the dial portion that is opposite to the first side. The inner detent profile is closer to a center of the dial portion than the outer detent profile. The outer detent profile includes a plurality of outer detents, and the inner detent profile includes a plurality of inner detents. The base portion includes an outer detent engaging member movable to selectively engage the outer detent profile, and an inner detent engaging member movable to selectively engage the inner detent profile.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
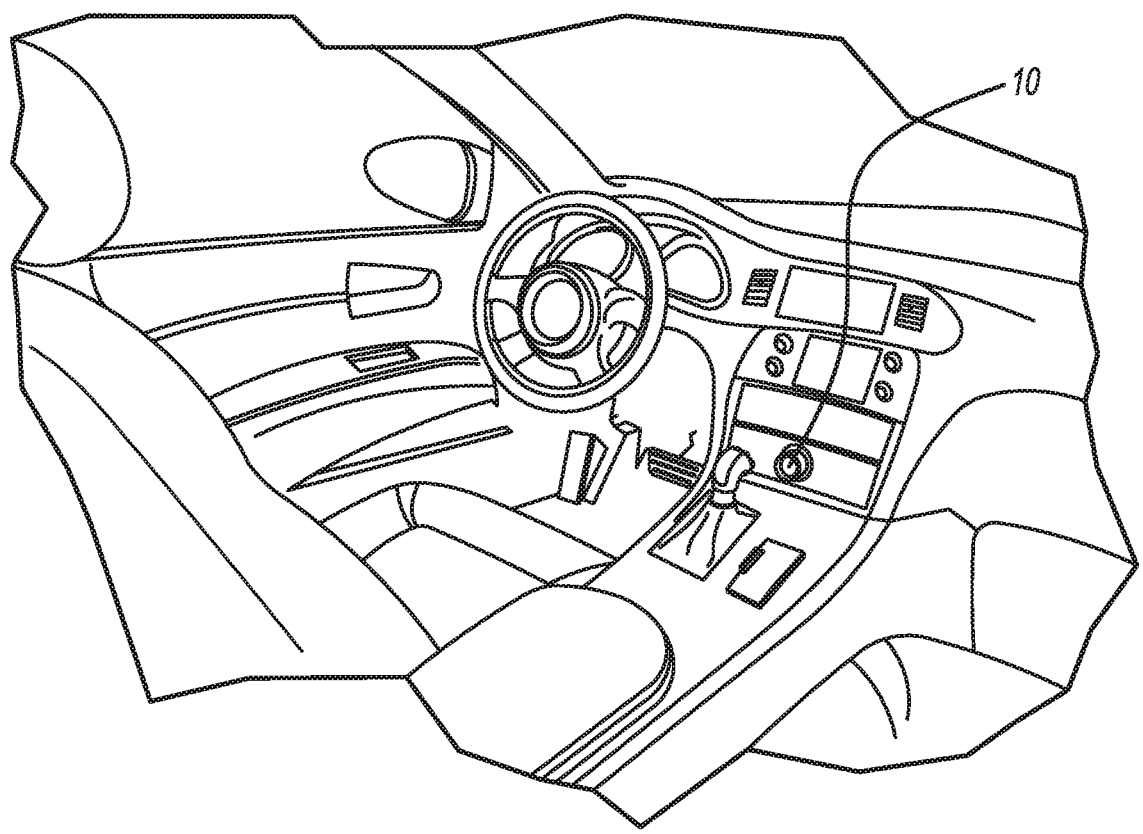
FIG. 1 illustrates an exemplary passenger cabin including a rotary dial assembly according to the present teachings.

With initial reference to FIG. 1, an exemplary vehicle passenger cabin including a rotary dial assembly 10 according to the present teachings is illustrated. Although the rotary dial assembly 10 is described herein as being used in a vehicle, the rotary dial assembly 10 can be used in any other suitable application to control features of any suitable control system. With respect to vehicle applications, the rotary dial assembly 10 can be included with an automobile control system for controlling any suitable functions, such as, but not limited to, a vehicle entertainment system, vehicle settings including vehicle drive settings, and/or a vehicle heating, ventilation, and air cooling (HVAC) system. The rotary dial assembly 10 can be configured to control multiple devices or features of any suitable system. For example and with respect to an HVAC system, the rotary dial assembly 10 can control fan speed settings, temperature settings, and airflow direction.

Figure 2:
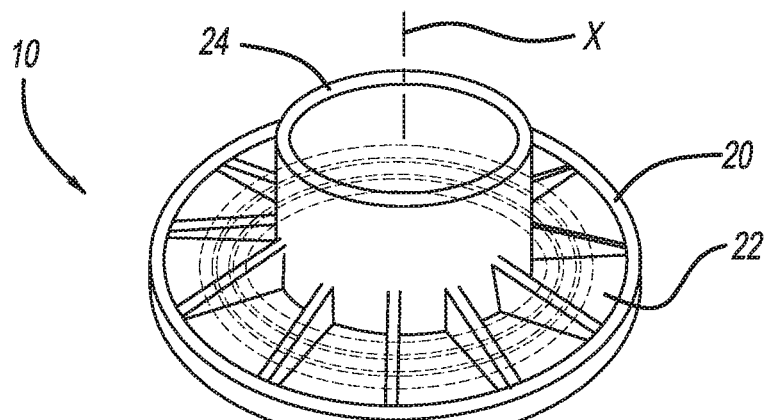
FIG. 2 is a perspective view of the rotary dial assembly of FIG. 1, the assembly including a dial portion and a base portion.
Figure 2:
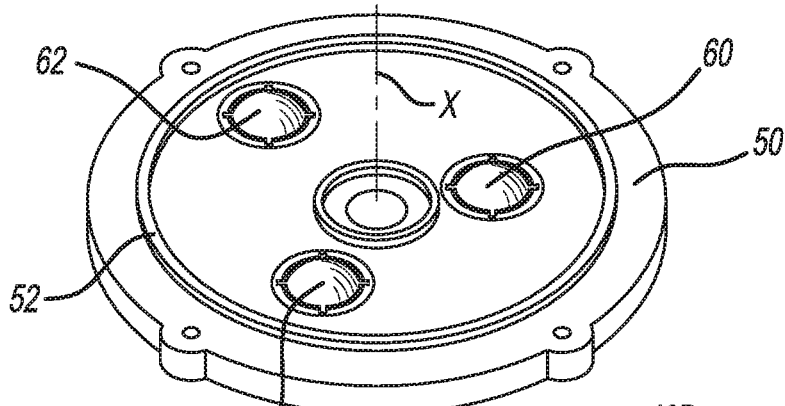

With continued reference to FIG. 1, and additional reference to FIG. 2, the rotary dial assembly 10 generally includes a dial portion 20 and a base portion 50. The dial portion 20 includes a first or outer side 22, from which a knob 24 extends. The knob 24 can be grasped and rotated to select various functions and/or enter various settings, such as a target temperature setting, fan speed setting, airflow direction, entertainment system/radio volume, etc.

Figure 3:
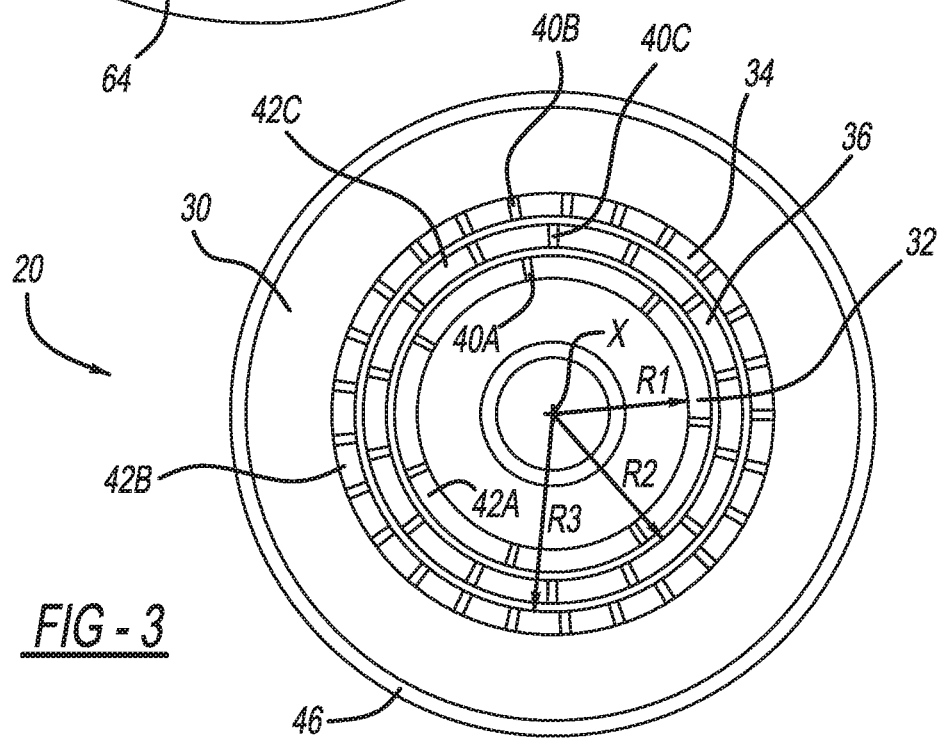
FIG. 3 is a plan view of an undersurface of the dial portion of the assembly of FIG. 1.

With continued reference to FIG. 2, and additional reference to FIG. 3, the dial portion 20 further includes a second or inner side 30, which is opposite to the outer side 22. The inner side 30 includes at least two detent profiles, such as an inner detent profile 32 and an outer detent profile 34. An intermediate detent profile 36 may also be included, as can any suitable number of additional detent profiles. Although the detent profiles 32, 34, and 36 are described as including detents, the detent profiles 32, 34, and 36 may include any other suitable structure or features configured to cause a user to feel resistance, or a "click," as the user rotates the knob 24. Such structure or features can be spaced apart or otherwise configured so that each one of the profiles 32, 34, and 36 has a different resistance or "click" profile, as the detent profiles 32, 34, and 36 do as described herein.

Each one of the detent profiles 32, 34, and 36 is circular and extends about a radial center X of the dial portion 20. The inner detent profile 32 is closest to the radial center X, the outer detent profile 34 is furthest from the radial center X, and the intermediate detent profile 36 is between the inner and outer detent profiles 32 and 34. The inner detent profile 32, the outer detent profile 34, and the intermediate detent profile 36 are spaced apart from the radial center X at radii R1, R2, and R3 respectively. Each one of the detent profiles 32, 34, and 36 includes a plurality of spaced apart ridges 40A, 40B, and 40C respectively, which define therebetween a plurality of detents 42A, 42B, and 42C respectively.

Thus the inner detent profile 32 includes a plurality of ridges 40A spaced apart about the radial center X at a first interval, the outer detent profile 34 includes a plurality of ridges 40B spaced apart about the radial center X at a second interval, and the intermediate detent profile 36 includes a plurality of ridges 40O spaced apart about the radial center X at a third interval. Each one of the first, second, and third intervals is different from one another, and can be any suitable intervals. In the example illustrated, the first interval is greater than each one of the second and third intervals. The second interval is less than each of the first and third intervals. And the third interval is greater than the first interval, but less than the second interval.

Each one of the detent profiles 32, 34, and 36 can include any suitable number of ridges 40A, 40B, and 40O. In the example illustrated, the inner detent profile 32 includes the least number of ridges 40A, such as seven, which generally corresponds to the number of fan speed positions included with a typical vehicle HVAC system. The outer detent profile 34 includes the greatest number of ridges 40B, such as twenty-six, which generally corresponds to the number of temperature setting positions included with a typical vehicle HVAC system, or the number of volume setting positions for a typical vehicle audio system. The intermediate detent profile 36 includes a number of ridges 40C, which is greater than the number of ridges 40A and less than the number of ridges 40B. In the example illustrated, the intermediate detent profile 36 includes fifteen ridges 40O, which can correspond to the number of radio station presets available, for example. The ridges 40A, 40B, and 40O can be spaced apart at any suitable interval, and can be provided in any suitable number, to provide a desired number of click positions as the knob 24 is turned.

With respect to the inner detent profile 32, the ridges 40A define inner detents 42A therebetween, each one of which extends a first length about the radial center. The ridges 40B of the outer detent profile 34 define detents 42B therebetween, each one of which extends a second length about the radial center. The ridges 40C of the intermediate detent profile 36 define detents 42C therebetween, each one of which extends a third length about the radial center. The first length is greater than each one of the second and third lengths. The second length is less than each one of the first and third lengths. The third lengths are greater than the first lengths, but less than the second lengths. Each one of the first, second, and third lengths can be any suitable lengths however, and the relative lengths illustrated are merely for exemplary purposes, and correspond to the distances that the ridges 40A. 40B, and 40C are spaced apart.

The inner side 30 of the dial portion 20 further includes a dial guide surface 46. The dial guide surface 46 is generally a circular ridge, which is sized and positioned to cooperate with base guide surface 52 (see FIGS. 2 and 4) of the base portion 50. Cooperation between the dial guide surface 46 and the base guide surface 52 allows the dial portion 20 to cooperate with the base portion 50 and be rotated relative to the base portion 50 when the knob 24 is turned.

Figure 4:
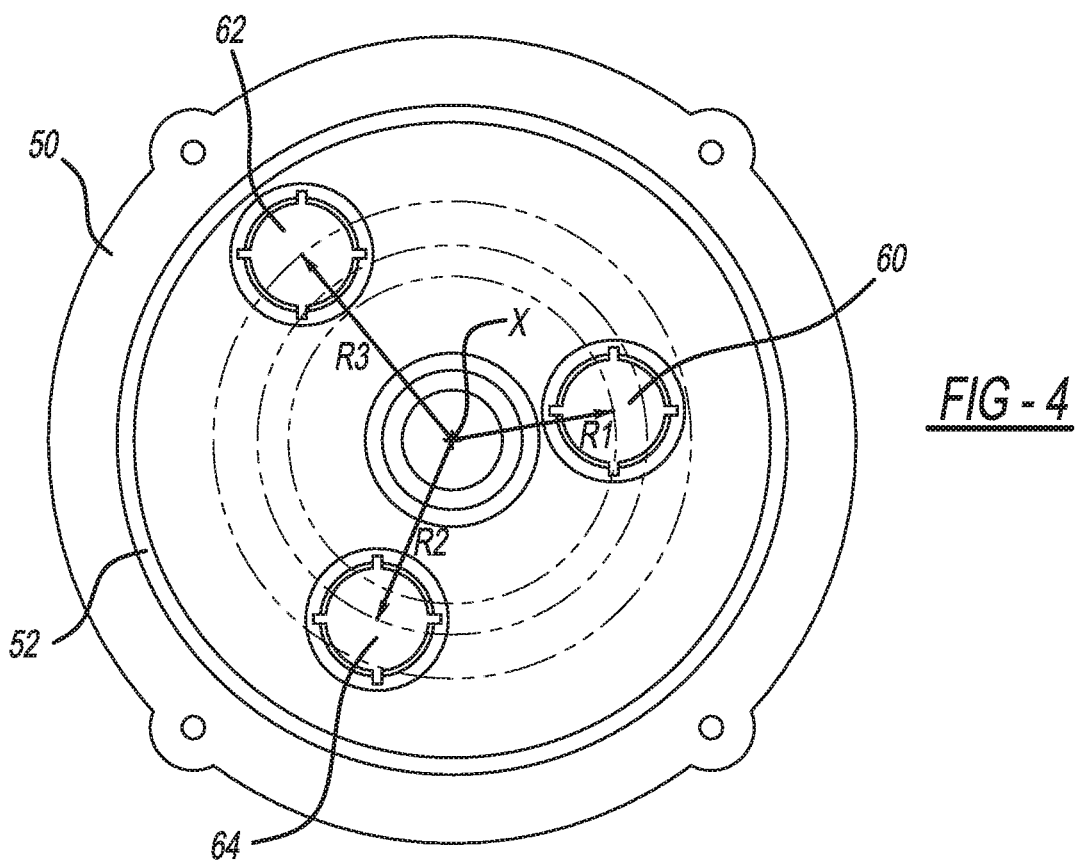
FIG. 4 is a plan view of an upper surface of the base portion of the assembly of FIG. 1.

With reference to FIGS. 2 and 4, the base portion 50 includes an inner detent engaging member 60, an outer detent engaging member 62, and an intermediate detent engaging member 64. The inner, outer, and intermediate detent engaging members 60, 62, and 64 are spaced apart from radial center X of the base portion 50 so as to be aligned with the inner, outer, and intermediate detent profiles 32, 34, and 36 respectively of the dial portion 20 when the dial portion 20 is seated on the base portion 50. Thus both the inner detent profile 32 and the inner detent engaging member 60 are spaced apart from radial center X at a first radius R1. The intermediate detent engaging member 64 and the intermediate detent profile 36 are both spaced apart from the radial center X at radius R2. The outer detent engaging member 62 and the outer detent profile 34 are both spaced apart from the radial center X at a third radius R3. The first radius R1 is less than both the second and third radii R2 and R3. The third radius R3 is greater than each of the first and second radii R1 and R2. The second radius R2 is greater than the first radius R1 and less than the third radius R3.

The inner, outer, and intermediate detent engaging members 60, 62, and 64 can be located at any suitable position along their respective radii, R1, R3, and R2 respectively. As illustrated in FIG. 4, the detent engaging members 60, 62, and 64 are generally evenly spaced apart around the radial center X. The detent engaging members 60, 62, and 64 are each actuation members, such as plungers, which can be selectively moved to engage the respective detent profiles 32, 34, and 36. Although the detent engaging members 60, 62, and 64 are generally described herein as plungers, they may take the form of any other suitable actuation member generally configured to selectively engage the detent profiles 32, 34, and 36.

Figure 5:
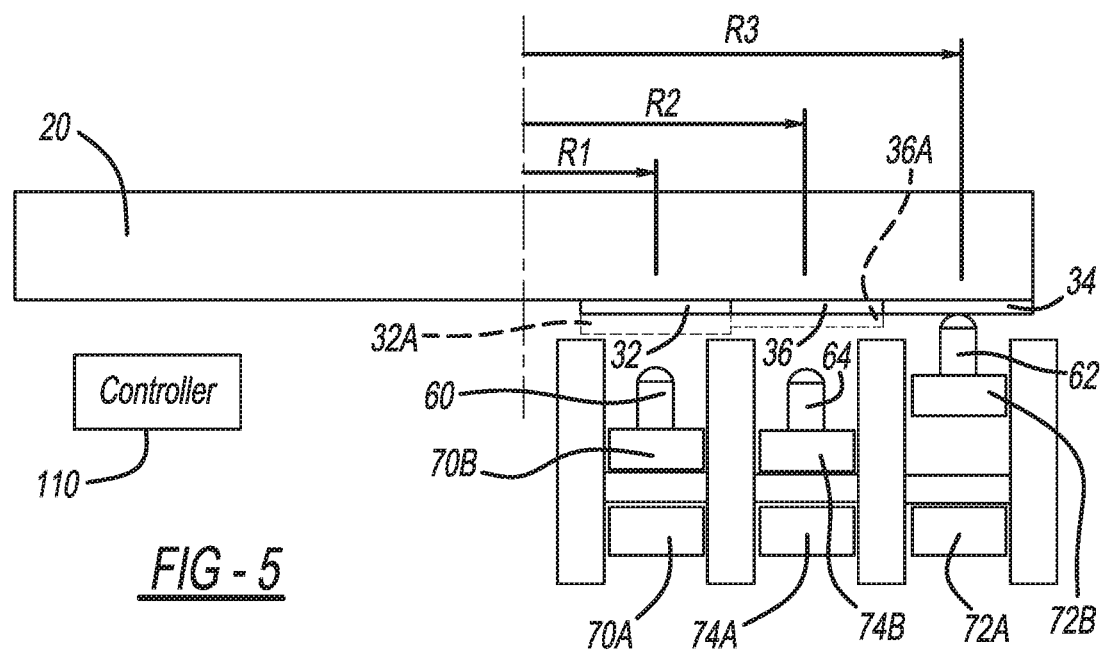
FIG. 5 is a schematic view showing interaction between the base portion and the dial portion.

With reference to FIG. 5, a schematic view of each one of the detent engaging members 60, 62, and 64 is illustrated, and their actuation will now be described in further detail. As illustrated, each one of the detent engaging members 60, 62, and 64 can be individually actuated by an electromagnet. For example, the inner detent engaging member 60 is associated with an inner electromagnet 70A and a permanent magnet 70B. The permanent magnet 70B is between the detent engaging member 60 and the inner electromagnet 70A. When the inner electromagnet 70A is energized, the inner permanent magnet 70B is repelled away from the inner electromagnet 70A, which moves in the inner detent engaging member 60 into cooperation with the inner detent profile 32. With the inner detent engaging member 60 in cooperation with the inner detent profile 32, as the user rotates the knob 24 he or she will feel resistance as the inner detent engaging member 60 comes into contact with each one of the ridges 40A. The user will feel and possibly hear a click as the detent engaging member 60 passes over the ridges 40A. When the electromagnet 70A is deactivated, the inner permanent magnet 70B will retract away from the inner detent profile 32, such that the engaging member 60 is no longer engaged with the detent profile 32. Magnetic forces will draw the permanent magnet 70B towards the inner electromagnet 70A.

Associated with the outer detent engaging member 62 is an outer electromagnet 72A and an outer permanent magnet 72B. Activation of the outer electromagnet 72A will repel the outer permanent magnet 72B so as to push the outer detent engaging member 62 into contact with the outer detent profile 34. When the electromagnet 72A is deactivated, the outer permanent magnet 72B will retract away from the outer detent profile 34 so that the engaging member 62 is no longer engaged with the detent profile 34. Magnetic forces will draw the permanent magnet 72B towards the outer electromagnet 72A.

Associated with the intermediate detent engaging member 64 is an intermediate electromagnet 74A and an intermediate permanent magnet 74B. Activation of the intermediate electromagnet 74A will repel the intermediate permanent magnet 74B so as to push the intermediate detent engaging member 64 into contact with the intermediate detent profile 36. When the intermediate electromagnet 74A is deactivated, the intermediate permanent magnet 74B will retract away from the intermediate detent profile 36 such that the intermediate engaging member 64 is no longer engaged with the intermediate detent profile 36 and magnetic forces will draw the permanent magnet 74B towards the intermediate electromagnet 74A.

Each one of the electromagnets 70A, 72A, and 74A can be energized at varying degrees so as to vary the force that the respective engaging members 60, 62, and 64 are in contact with the respective detent profiles 32, 34, and 36. Thus by varying the activation energy supplied to the electromagnets 70A, 72A, and 74A, the torque profile of the rotary dial assembly 10 can be altered. For example, when any one of the electromagnets 70A, 72A, and 74A is highly energized so as to firmly press the respective detent engaging members 60, 62, and 64 against the detent profiles 32, 34, and 36, a greater degree of torque will be required to turn the knob 24, as compared to when the electromagnets 70A, 72A, and 74A are energized to a lesser extent.

The torque profile can also be altered by arranging the detent profiles 32, 34, and 36 in different planes relative to each other. For example and as illustrated in FIG. 5, the inner detent profile 32 can be configured as inner detent profile 32A, which is arranged lower and closer to the position of the detent engaging member 60 when the electromagnet 70A is not energized. Thus, when the electromagnet 70A is energized, it will press the detent engaging member 60 against the inner detent profile 32A with a greater force as compared to when the detent profile is at 32 and the electromagnet 70A is energized to the same degree. Similarly, the intermediate detent profile 36 can be configured as intermediate detent profile 36A, which is arranged lower and closer to the position of the detent engaging member 64 when the electromagnet 74A is not energized. Thus, when the electromagnet 74A is energized, it will press the detent engaging member 64 against the intermediate detent profile 36A with a force greater than when the detent profile is at 36, but less than if the detent profile 36A were coplanar with detent profile 32A. The outer detent profile 34 can also be arranged in a plane closer to the outer detent engaging member 62, so as to alter the torque profile of the outer detent profile 34.

The present teachings further provide for a controller 110. The controller 110 can be part of, or include, processor hardware (shared, dedicated, or group) that executes code, as well as memory hardware (shared, dedicated, or group) that stores code executed by the processor hardware. The code is configured to provide the features of the controller described herein, such as individual actuation of the detent engaging members 60, 62, and 64, and control of the degree to which the electromagnets 70A, 72A, and 74A are energized. The controller 110 can thus be any suitable control module, such as any suitable computing device onboard a vehicle.

The controller 110 is configured to selectively energize any one of the electromagnets 70A, 72A, and 74A in response to, for example, selection of a particular mode or function by a user. For example, when a user selects temperature control of an HVAC system or volume control of an audio system, the controller 110 can energize the outer electromagnet 72A so as to move the outer detent engaging member 62 into cooperation with the outer detent profile 34. As a result, the detent engaging member 62 will pass across the ridges 40B and move from one detent 42B to the next detent 42B after only a slight degree of rotation of the knob 24. The outer detent profile 34 is particularly well suited for temperature and volume control due to the large number of potential rotational positions, such as about twenty-six as illustrated.

If the user selects fan speed control, for example, the controller 110 can energize the inner electromagnet 70A so as to move the inner detent engaging member 60 into cooperation with the inner detent profile 32. The ridges 40A of the inner detent profile 32 are widely spaced apart, and thus the detent engaging member 60 will contact the ridges 40A only after the knob 24 has been turned a relatively large distance (as compared to when the outer detent engaging member 62 is in cooperation with the outer detent profile 34). The inner detent profile 32 is thus particularly well suited for fan speed control, because vehicle HVAC systems often include about six or seven fan speed positions.

The controller is also configured to energize the intermediate electromagnet 74A to move the intermediate detent engaging member 64 into cooperation with the intermediate detent profile 36. The ridges 400 of the intermediate detent profile 36 are spaced apart at intermediate intervals as described above such that about fifteen ridges 40C are included. The intermediate detent profile is particularly well suited for, for example, browse and tune functions due to the large number of potential rotational positions, but also for the need to have more clearly defined click positions as compared to profile 34.

The present teachings thus advantageously provide for a rotary dial assembly including two or more, such as three as illustrated, detent profiles that provide different click feedback profiles when the knob 24 is rotated. The different detent profiles 32, 34, and 36 can be selected based on the particular feature being controlled. This allows a single rotary dial assembly 10 to be used to control multiple functions, thus reducing manufacturing and installation costs, and providing a less cluttered vehicle cockpit. The amount of torque required to rotate the knob 24 can also be advantageously varied by varying the degree to which the electromagnets 70A, 72A, and 74A are energized, or providing the detent profiles 32, 34, 36 in different planes, so as to customize torque of the knob 24 to the particular function being controlled.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A rotary dial assembly comprising:
   a dial portion including a knob extending from a first side of the dial portion;
   an outer detent profile and an inner detent profile on a second side of the dial portion that is opposite to the first side, the inner detent profile is closer to a center of the dial portion than the outer detent profile, the outer detent profile includes a plurality of outer detents, and the inner detent profile includes a plurality of inner detents; and
   a base portion including an outer detent engaging member movable to selectively engage the outer detent profile, and an inner detent engaging member movable to selectively engage the inner detent profile;
   wherein:
     the outer detent engaging member is movable in response to activation of an outer electromagnet; and
     the inner detent engaging member is movable in response to activation of an inner electromagnet.

2. The rotary dial of claim 1, wherein the dial portion includes more of the plurality of outer detents than the plurality of inner detents.

3. The rotary dial of claim 1, wherein each one of the outer detent profile and the inner detent profile is circular.

4. The rotary dial of claim 1, wherein each one of the outer and inner detent engaging members are plungers.

5. The rotary dial of claim 1, wherein:
   the outer detent engaging member is configured to selectively engage the outer detent profile at varying degrees of pressure to vary how much torque is required to turn the knob; and
   the inner detent engaging member is configured to selectively engage the inner detent profile at varying degrees of pressure to vary how much torque is required to turn the knob.

6. The rotary dial of claim 1, wherein the outer detent profile and the inner detent profile are coplanar.

7. The rotary dial of claim 1, wherein the outer detent profile and the inner detent profile are non-coplanar.

8. The rotary dial of claim 1, further comprising an intermediate detent profile between the inner and outer detent profiles; and
   an intermediate detent engaging member of the base portion movable to selectively engage the intermediate detent profile.

9. The rotary dial of claim 1, wherein the rotary dial is configured to control multiple functions of at least one of a vehicle entertainment system and a vehicle heating, ventilation, and cooling system.

10. A method for changing a torque and detent profile of a rotary dial assembly comprising:
    moving one of an outer or inner detent engaging member of a base portion of the rotary dial assembly into cooperation with an outer or inner detent profile respectively of an inner side of a dial portion, a knob extends from an outer side of the dial portion, the outer detent profile includes a plurality of outer detents and the inner detent profile includes a plurality of inner detents, more of the plurality of outer detents are included as compared to the plurality of inner detents; and
    moving the outer or inner detent engaging member with an electromagnet.

11. The method of claim 10, further comprising varying pressure of cooperation between the outer detent engaging member and the outer detent profile, and varying pressure of cooperation between the inner detent engaging member and the inner detent profile, to vary how much torque is required to turn the knob.

12. The method of claim 10, further comprising:
    moving an intermediate detent engaging member of the base portion into cooperation with an intermediate detent profile located between the inner and outer detent profiles, the intermediate detent profile having a plurality of intermediate detents, a number of which is greater than the plurality of inner detents and less than the plurality of outer detents.

13. The method of claim 10, wherein each one of the outer detent profile and the inner detent profile are circular.

14. The method of claim 10, wherein the outer detent profile and the inner detent profile are coplanar.

15. The method of claim 10, wherein the outer detent profile and the inner detent profile are non-coplanar.

16. The method of claim 10, further comprising controlling with the rotary dial multiple functions of at least one of a vehicle entertainment system and a vehicle heating, ventilation, and cooling system.

* * * * *